United States Patent
Gluck

(10) Patent No.: US 10,091,165 B2
(45) Date of Patent: *Oct. 2, 2018

(54) METHODS AND SYSTEMS FOR PROVIDING CONTEXT-BASED OUTBOUND PROCESSING APPLICATION FIREWALLS

(71) Applicant: salesforce.com, inc., San Francisco, CA (US)

(72) Inventor: Yoel Gluck, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,333

(22) Filed: Jun. 27, 2016

(65) Prior Publication Data

US 2016/0308830 A1    Oct. 20, 2016

Related U.S. Application Data

(63) Continuation of application No. 12/982,769, filed on Dec. 30, 2010, now Pat. No. 9,407,603.

(60) Provisional application No. 61/358,486, filed on Jun. 25, 2010.

(51) Int. Cl.
*H04L 29/06*    (2006.01)

(52) U.S. Cl.
CPC ...... *H04L 63/0227* (2013.01); *H04L 63/0218* (2013.01); *H04L 63/102* (2013.01); *H04L 63/1408* (2013.01); *H04L 63/1433* (2013.01)

(58) Field of Classification Search
CPC ............. H04L 63/0227; H04L 63/1408; H04L 63/0218

See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

FOREIGN PATENT DOCUMENTS

WO    2007098960 A1    9/2007

OTHER PUBLICATIONS

Non-Final Office Action for U.S. Appl. No. 12/982,769 dated Aug. 23, 2012, 9 pages.

(Continued)

*Primary Examiner* — James R Turchen
(74) *Attorney, Agent, or Firm* — Jeffery, Watson, Mendonsa & Hamilton, LLC

(57) ABSTRACT

Outbound processing with application firewalls. An outbound message is generated with an application. The outbound message includes at least a trustworthiness indicator and/or marking information for the one or more portions of the outbound message. The outbound message is received by an application firewall. The outbound message is analyzed based on the trustworthiness indicator and/or marking information, and context information. An action is performed on the outbound message based on the trustworthiness indicator and/or marking information, and the context information.

18 Claims, 6 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,408,336 B1 | 6/2002 | Schneider et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,854,063 B1 | 2/2005 | Qu et al. | |
| 6,880,089 B1 * | 4/2005 | Bommareddy | H04L 29/12367 709/200 |
| 7,058,822 B2 * | 6/2006 | Edery | G06F 21/52 726/22 |
| 7,096,495 B1 | 8/2006 | Warrier et al. | |
| 7,231,665 B1 * | 6/2007 | McArdle | G06F 21/606 726/13 |
| 7,340,411 B2 | 3/2008 | Cook | |
| 7,342,906 B1 | 3/2008 | Calhoun | |
| 7,409,547 B2 * | 8/2008 | Stamos | G06F 21/606 705/51 |
| 7,594,270 B2 * | 9/2009 | Church | G06F 21/552 726/23 |
| 7,620,655 B2 | 11/2009 | Larsson et al. | |
| 7,719,966 B2 * | 5/2010 | Luft | H04L 47/20 370/229 |
| 7,797,752 B1 * | 9/2010 | Vaidya | H04L 12/4641 717/170 |
| 7,818,343 B1 * | 10/2010 | Sekhar | G06Q 10/10 707/781 |
| 8,087,081 B1 * | 12/2011 | Chun | H04L 67/101 726/22 |
| 8,161,538 B2 * | 4/2012 | Kausik | G06Q 20/027 370/351 |
| 8,353,021 B1 * | 1/2013 | Satish | H04L 63/0263 709/202 |
| 8,566,919 B2 * | 10/2013 | Meisel | H04L 63/0218 709/223 |
| 8,904,511 B1 | 12/2014 | O'Neill et al. | |
| 9,294,442 B1 | 3/2016 | Lian et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2002/0199120 A1 * | 12/2002 | Schmidt | H04L 12/2856 726/8 |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0172167 A1 * | 9/2003 | Judge | H04L 51/12 709/229 |
| 2003/0172291 A1 * | 9/2003 | Judge | G06F 21/554 726/1 |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0088409 A1 | 5/2004 | Braemer et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0262554 A1 | 11/2005 | Brooks et al. | |
| 2005/0283835 A1 * | 12/2005 | Lalonde | G06F 21/563 726/24 |
| 2006/0070122 A1 * | 3/2006 | Bellovin | H04L 63/0236 726/14 |

(56) References Cited

U.S. PATENT DOCUMENTS

| | | |
|---|---|---|
| 2006/0168345 A1 | 7/2006 | Siles et al. |
| 2006/0206615 A1* | 9/2006 | Zheng ............... H04L 63/0227 709/229 |
| 2006/0212930 A1* | 9/2006 | Shull ................. G06F 21/55 726/10 |
| 2007/0055694 A1* | 3/2007 | Ruge .................. G06Q 30/02 |
| 2007/0088534 A1 | 4/2007 | MacArthur et al. |
| 2007/0118803 A1 | 5/2007 | Crawford |
| 2007/0130130 A1 | 6/2007 | Chan et al. |
| 2007/0299984 A1* | 12/2007 | Roy ................... H04L 63/0245 709/232 |
| 2008/0010243 A1 | 1/2008 | Weissman et al. |
| 2008/0022384 A1* | 1/2008 | Yee ................... H04L 63/0263 726/11 |
| 2008/0229088 A1 | 9/2008 | Barth et al. |
| 2008/0282338 A1* | 11/2008 | Beer ................. G06F 21/566 726/12 |
| 2008/0307525 A1 | 12/2008 | Nickle |
| 2009/0126005 A1* | 5/2009 | Kim .................. H04L 63/0227 726/14 |
| 2009/0249125 A1 | 10/2009 | Bhatawdekar et al. |
| 2009/0282045 A1 | 11/2009 | Hsieh et al. |
| 2009/0288084 A1* | 11/2009 | Astete ............... G06F 9/45533 718/1 |
| 2009/0307533 A1 | 12/2009 | Niikkonen et al. |
| 2009/0320131 A1* | 12/2009 | Huang .............. H04L 29/12066 726/23 |
| 2010/0070323 A1 | 3/2010 | Polcari et al. |
| 2010/0077468 A1 | 3/2010 | Pragides et al. |
| 2010/0146615 A1* | 6/2010 | Locasto ............ H04L 63/1408 726/11 |
| 2010/0306184 A1* | 12/2010 | Wang ................ H04L 63/02 707/707 |
| 2010/0325357 A1 | 12/2010 | Reddy et al. |
| 2010/0332837 A1* | 12/2010 | Osterwalder ....... H04L 63/0245 713/172 |
| 2011/0035794 A1 | 2/2011 | Wang et al. |
| 2011/0055391 A1 | 3/2011 | Schneider |
| 2011/0145435 A1* | 6/2011 | Bhatawdekar ........ G06F 21/566 709/238 |
| 2011/0154471 A1 | 6/2011 | Anderson et al. |
| 2011/0173443 A1 | 7/2011 | Osterwalder et al. |
| 2011/0191848 A1* | 8/2011 | Zorn ................. G06F 11/00 726/22 |
| 2012/0047577 A1* | 2/2012 | Costinsky ............ H04L 67/02 726/22 |
| 2012/0060221 A1* | 3/2012 | Gerber ............... G06F 21/56 726/25 |
| 2012/0222117 A1* | 8/2012 | Wong ................ H04L 63/02 726/23 |

OTHER PUBLICATIONS

Non-Final Office Action for U.S. Appl. No. 12/982,769 dated Jun. 11, 2014, 21 pages.
Final Office Action for U.S. Appl. No. 12/982,769 dated Feb. 4, 2013, 8 pages.
Final Office Action for U.S. Appl. No. 12/982,769 dated Dec. 26, 2014, 12 pages.
Non-Final Office Action for U.S. Appl. No. 12/982,769 dated Sep. 21, 2015, 12 pages.
Bhaskar Rimal et al. "A Taxpmony and Survey of Cloud Computing Systems," 2009, IEEE computer society, pp. 44-51.
Dorothy Denning et al. "Requirement and model for IDES—A real-time Intrusion-detection Expert System," Aug. 1985, SRI International, pp. 1-70.
Final Office Action for U.S. Appl. No. 12/982,725 dated Dec. 31, 2013, 18 pages.
Final Office Action for U.S. Appl. No. 12/982,725 dated Nov. 19, 2014, 24 pages.
Final Office Action for U.S. Appl. No. 12/982,751 dated Jun. 12, 2015, 18 pages.
Final Office Action for U.S. Appl. No. 12/982,751 dated May 22, 2013, 18 pages.
Non-Final Office Action for U.S. Appl. No. 12/982,725 dated Jun. 19, 2014, 21 pages.
Non-Final Office Action for U.S. Appl. No. 12/982,725 dated Mar. 29, 2013, 18 pages.
Non-Final Office Action for U.S. Appl. No. 12/982,751 dated Dec. 17, 2014, 15 pages.
Non-Final Office Action for U.S. Appl. No. 12/982,751 dated Oct. 25, 2012, 16 pages.
Non-Final Office Action for U.S. Appl. No. 15/194,429 dated Nov. 14, 2016, 9 pages.
Notice of Allowance for U.S. Appl. No. 12/982,725 dated Jun. 3, 2015, 8 pages.
Notice of Allowance for U.S. Appl. No. 12/982,751 dated Jan. 21, 2016, 17 pages.
Notice of Allowance for U.S. Appl. No. 12/982,769 dated Apr. 1, 2016, 12 pages.
Notice of Allowance for U.S. Appl. No. 14/874,225 dated Mar. 31, 2016, 10 pages.
Notice of Allowance for U.S. Appl. No. 15/194,429 dated Apr. 10, 2017, 8 pages.
Web Canary: A Virtualized Web Browser to Support Large-Scale Silent Collaboration in Detecting Malicious Web Sites; Jiang Wang et al.; CollaborateCom 2008, LNICST 10, pp. 24-33, 2009.
Final Office Action for U.S. Appl. No. 15/159,732 dated Feb. 5, 2018, 13 pages.
Non-Final Office Action for U.S. Appl. No. 15/159,732 dated Jun. 8, 2017, 16 pages.

* cited by examiner

METHODS AND SYSTEMS FOR PROVIDING CONTEXT-BASED OUTBOUND PROCESSING APPLICATION FIREWALLS

CLAIM OF PRIORITY

This continuation application claims the benefit of U.S. patent application Ser. No. 12/982,769, entitled "METHODS AND SYSTEMS FOR PROVIDING CONTEXT-BASED OUTBOUND PROCESSING APPLICATION FIREWALLS", by Yoel Gluck, filed Dec. 30, 2010, and also claims the benefit of U.S. Provisional Patent Application No. 61/358,486 entitled "Methods And Systems For Providing Context-Based Outbound Processing Application Firewalls", by Yoel Gluck, filed Jun. 25, 2010, the entire contents of which are incorporated herein by reference.

CROSS REFERENCE TO RELATED APPLICATIONS

The following commonly owned, United States Patents and Patent Applications, including the present application, are related to each other. Each of the other patents/applications are incorporated by reference herein in its entirety:

U.S. patent application Ser. No. 12/982,725 entitled "METHODS AND SYSTEMS FOR CONTEXT-BASED APPLICATION FIREWALLS", by Yoel Gluck, filed Dec. 30, 2010, now U.S. Pat. No. 9,160,710; and U.S. patent application Ser. No. 14/874,225, entitled "METHODS AND SYSTEMS FOR CONTEXT-BASED APPLICATION FIREWALLS", by Yoel Gluck, filed Oct. 2, 2015, which is a continuation application of U.S. patent application Ser. No. 12/982,725; and U.S. patent application Ser. No. 12/982,751 entitled "Methods And Systems For Providing a Token-Based Application Firewall Correlation", by Yoel Gluck, filed Dec. 30, 2010, now U.S. Pat. No. 9,350,705; and U.S. patent application Ser. No. 15/159,732 entitled "Methods And Systems For Providing a Token-Based Application Firewall Correlation", by Yoel Gluck, filed May 19, 2016, which is a continuation application of U.S. patent application Ser. No. 12/982,751.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the invention relate generally to firewalls and network security. More particularly, embodiments of the invention relate to techniques for providing context-based outbound processing application firewalls.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Web applications are a big part of applications today. They vary from simple web site, travel and booking, enterprise, banking applications and many more. Each of these applications has a set of security threats relevant to it. These applications tend to have security code integrated in to the application itself, however; because these applications are relatively large, the surface is too big to cover with a single choke point. With the increased complexity comes additional risk for undetected vulnerabilities. This is one of the reasons web applications some times use a separate web application firewall system. This allows a separate code base to use a single choke point and evaluate the entire application behavior at run time for potential vulnerabilities.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Figure 1A:
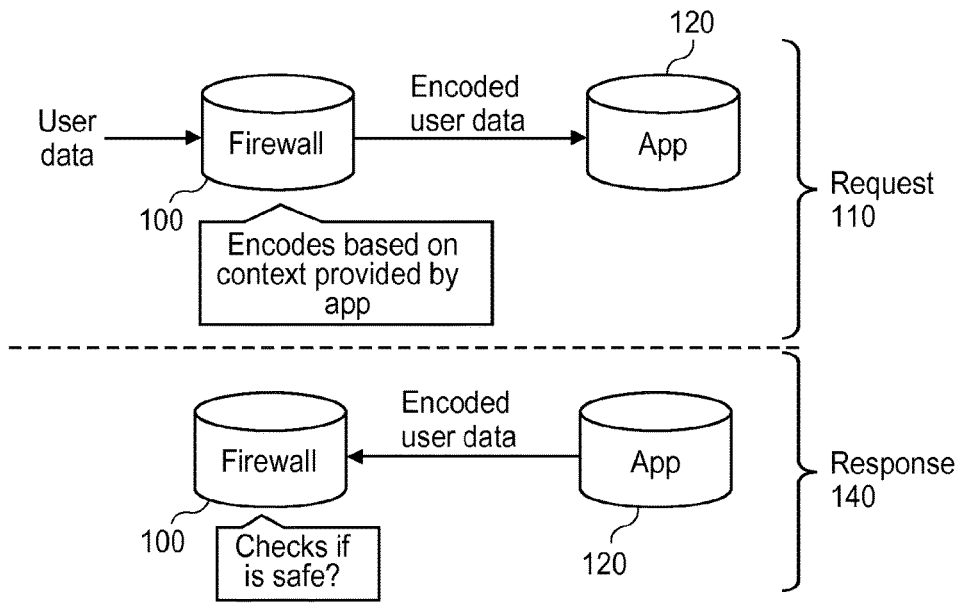
FIG. 1a is a conceptual diagram of a first configuration in which outbound firewall processing may be provided.

As used herein, "application firewall" and/or "firewall" generally refers to an application firewall entity that provides a higher-level analysis of network traffic (e.g., the application level, layer 5+), for example, inspecting traffic specific to an application based on the logic of the application. In contrast, traditional firewalls inspect Layers 3 and 4 and generally do IP- and port-based filtering and logic. Described herein are application firewalls that provide outbound traffic processing on messages from one or more applications. The techniques described herein may be utilized by application firewalls, but may also be incorporated into traditional firewalls.

In general, outbound processing is described as being performed by an application firewall. In some embodiments this functionality may be performed exclusively by an application firewall. In other embodiments outbound firewall processing can be in the application firewall, application, and/or any other location or stack. By using context data to filter outbound data in an application firewall and protect against security vulnerabilities, portions of data may be marked for their source and/or trustworthiness and then the firewall will use that data in order to filter out potential vulnerabilities. For example, to protect against XSS, untrusted data may be marked and then the firewall may ensure that none of the data can be treated as executable or otherwise dangerous data. In one embodiment, the data traffic is outbound from a multitenant database environment; however, in alternate embodiments, other non-multitenant environments may also utilize the techniques described herein.

As used herein, the term multitenant database system or multitenant database environment refers to those systems in which various elements of hardware and software of the database system may be shared by one or more customers. For example, a given application server may simultaneously process requests for a great number of customers, and a given database table may store rows for a potentially much greater number of customers.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

In one embodiment, data can be marked by the application for source and/or trustworthiness on input from user, or the marking can be accomplished by other component that is context aware and can provide that information. This can be the application server itself, the firewall that was provided with that information and handled on request input, etc. In one embodiment, data can be marked/encoded differently (e.g., trusted vs. untrusted) at different locations and times. For example, data can be marked/encoded as input at the firewall on input from user, then when application receives the request it can create an object marked as input, but the data can be cleaned/decoded so it is easier to handle, for example, for search and comparison, then when saved into local storage, the data itself can be again marked/encoded.

Data can be marked in different ways, for example: each byte can be marked by encoding the byte in a specific way. Using location based information, for example, a header says that byte range 20-40 in the HTTP data is user input, using boundaries like MIME to separate the portions and identify trusted vs. un-trusted, HTML comments, etc. Other header configurations can also be supported, as this is but one example.

In one embodiment, the firewall can use static analysis to discover if any un-trusted code will be executed at run time, or the firewall can use a parser to do this. When the firewall identifies code that is to be executed without permission, the firewall can react based on policies. For example, if it detects un-trusted code as a Java Script code, the firewall can insert additional code to be non-executable, escape the data, or it can block the response, etc.

In some cases it will not be simple to encode real data because of the complexity of the systems involved. In such cases, a side channel monitoring system can be used to actively monitor each request. In one embodiment, this side channel can use the same real data, store it encoded and then detect encoded user data being injected/used in vulnerable locations/ways.

In one implementation we would have the encoded/marked data continue as encoded/marked to the client and have the client enforce the safety rules. For example, the client will make sure not to execute any user input data. The client will then be able to decode if needed when safe.

FIG. 1a is a conceptual diagram of a first configuration in which outbound firewall processing may be provided. In the example of FIG. 1a, firewall 100 receives request 110 including user data from a remote user device (not illustrated in FIG. 1a). Firewall 100 encodes the user data based on context information. In one embodiment, the context information may be received from application 120. The context information may also be maintained by firewall 100, or some other system component. Request 110 with the encoded data is then sent to application 120 by firewall 100.

Application 120 operates on request 110 to generate response 140, which includes whatever data may be provided by application 120 as well as encoded user data. When firewall 100 receives response 140, firewall 100 checks response 140 to determine whether the response is safe based, at least in part, on the encoded user data and context information such as the location in the page the user data is included.

Figure 1B:
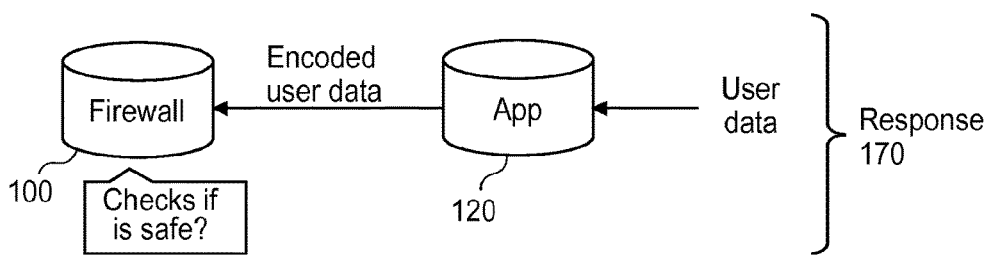
FIG. 1b is a conceptual diagram of a second configuration in which outbound firewall processing may be provided.

FIG. 1b is a conceptual diagram of a second configuration in which outbound firewall processing may be provided. In the example of FIG. 1b, firewall 100 receives a request including user data from a remote user device (not illustrated in FIG. 1b). Firewall 100 does not encode the user data. The request is sent to application 120 by firewall 100.

Application 120 operates on the request to generate response 170, which includes whatever data may be provided by application 120 as well as encoded user data. In the example of FIG. 1b, application 120 encodes the user data based on context information maintained by application 120, or some other system component. When firewall 100 receives response 170, firewall 100 checks response 170 to determine whether the response is safe based, at least in part, on the encoded user data and context information such as the location in the page the user data is included.

Figure 2:
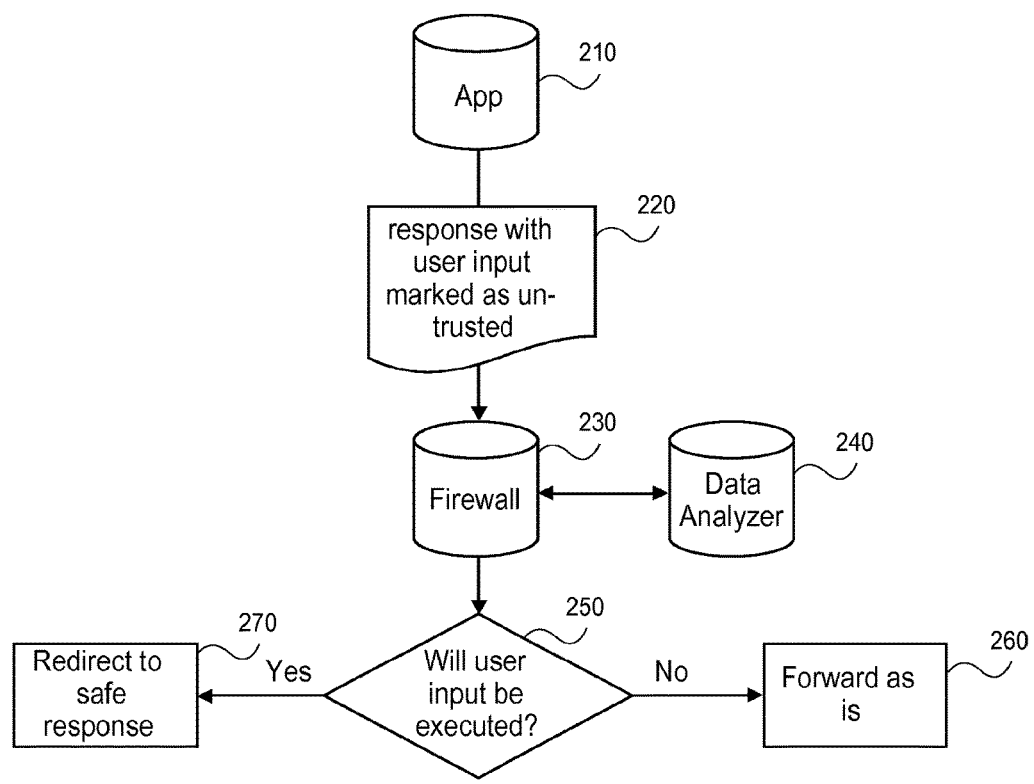
FIG. 2 is a flow diagram of one embodiment of a technique for a firewall to respond to untrusted user input from an application.

FIG. 2 is a flow diagram of one embodiment of a technique for a firewall to respond to untrusted user input from an application. Application 210 generates a response as described above. Response 220 with user input marked as untrusted, 220, is transmitted from application 210 to firewall 230.

Firewall 230 interacts with data analyzer 240 to analyze response 220 and take appropriate action based on the data encoding/marking information in response 220. In one embodiment, data analyzer 240 may operate in conjunction with, or store data from, application 210. If the untrusted user input seems to be located in such a way that if sent to the user it will not be executed, 250, then response 220 is forwarded as is, 260. If the untrusted user input will be executed, 250, then response 220 is redirected to allow a safe response, 270. In addition or instead of redirection, the firewall can perform other actions such as: alert an administrator, output escape the untrusted user data based on the context information, etc.

Figure 3:
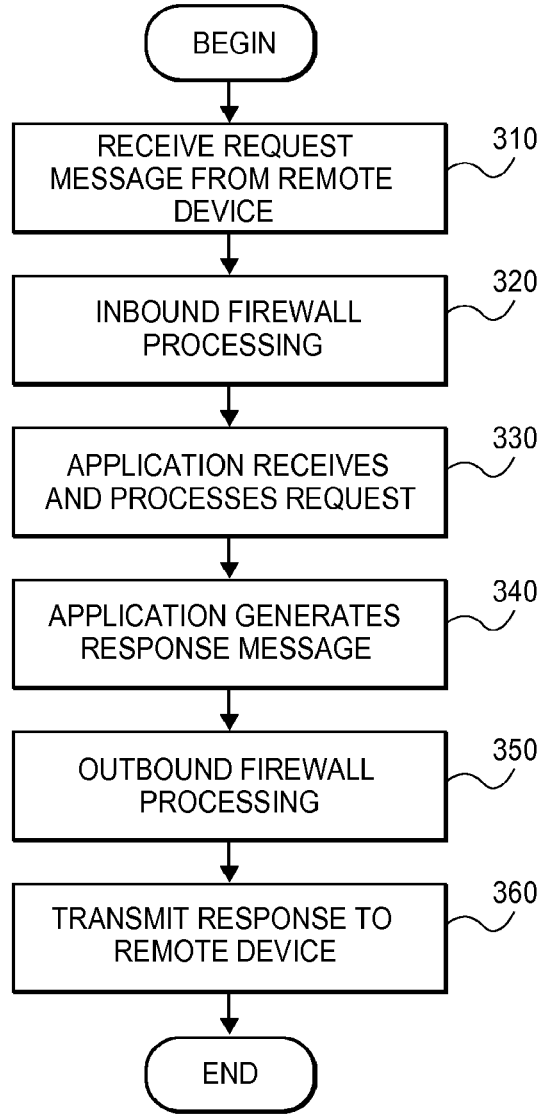
FIG. 3 is a flow diagram of one embodiment of a request and response in a system supporting outbound firewall processing.

FIG. 3 is a flow diagram of one embodiment of a request and response in a system supporting outbound firewall processing. The functionality described with respect to FIG. 3 may be provided by a firewall and/or an application as described above with respect to FIGS. 1 and 2.

The request message is received from a remote device, 310. In one embodiment, the request message is received by a firewall within a multitenant environment. Embodiments of multitenant environments are described in greater detail below. In other embodiments, the request message may be received by a firewall of an intranet or other configuration of computing resources that may provide a response to the request message.

Any inbound firewall processing that may be performed is performed by the firewall, 320. In one embodiment, the firewall may also mark/encode data in the request message. The encoding may be based on, for example, context information provided by the application, or by some other entity within the system. The context information may be related to user, client entity, session, field type, location of output in the page, browser/application type, rendering systems, etc. In one embodiment, the application may also use the mark/encoding information and/or perform proper actions, not just the firewall. That is, the functionality described for the firewall may be provided by the firewall, application, or any other location/stack.

The firewall forwards the request message to the application. The application receives the request message and processes it, 330. Depending on the contents of the request message, the application may perform, or cause to be performed, various functions in order to generate a response message, 340. During this processing, the application may gather and/or update context information. This context information may be forwarded to the firewall. When the application generates the response message, it is forwarded from the application to the firewall.

The firewall performs outbound processing on the response message, 350. The outbound firewall processing may be performed as described herein. In one embodiment, the firewall utilizes context information provided by at least the application. Context information may be provided by other system components as well. In one embodiment, the firewall may be coupled with (or include) a data analyzer (e.g., 240 in FIG. 2) that may manage the context information.

The outbound firewall processing may include various operations discussed herein. The outbound processing may include, for example, rerouting of the response message, tagging the response message, dropping a portion of the response message, modifying a portion of the response message, and/or any other application firewall operation that may be performed on inbound/outbound traffic. After the outbound firewall processing, the response message may be transmitted to the remote device from which the request message was received, 360.

Figure 4:
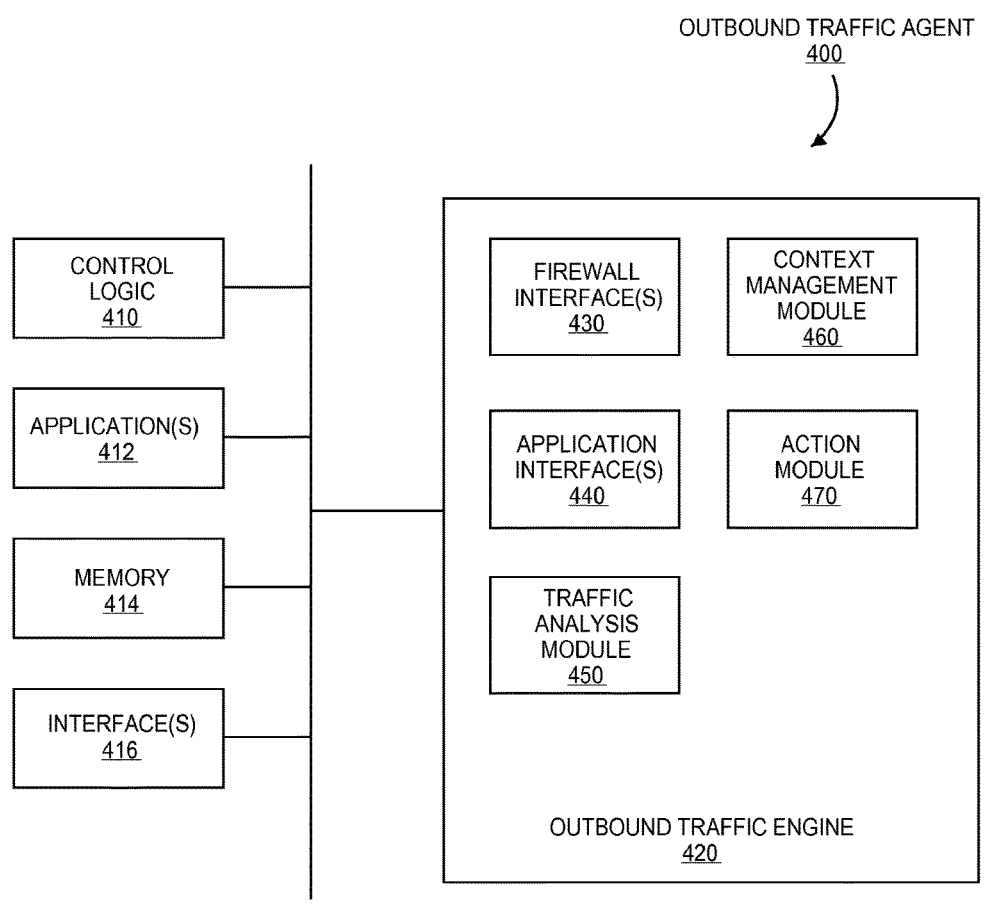
FIG. 4 is a block diagram of one embodiment of an agent to support outbound firewall processing.

FIG. 4 is a block diagram of one embodiment of an agent to support outbound firewall processing. The components illustrated in FIG. 4 may be part of a firewall, an application, and/or any combination thereof. Further, the firewall and/or the application may be part of a multitenant database environment.

Outbound traffic agent 400 includes control logic 410, which implements logical functional control to direct operation of outbound traffic agent 400, and/or hardware associated with directing operation of outbound traffic agent 400. Logic may be hardware logic circuits and/or software routines. In one embodiment, outbound traffic agent 400 includes one or more applications 412, which represent code sequence and/or programs that provide instructions to control logic 410.

Outbound traffic agent 400 includes memory 414, which represents a memory device and/or access to a memory resource for storing data and/or instructions. Memory 414 may include memory local to outbound traffic agent 400, as well as, or alternatively, including memory of the host system on which outbound traffic agent 400 resides. Outbound traffic agent 400 also includes one or more interfaces 416, which represent access interfaces to/from (an input/output interface) outbound traffic agent 400 with regard to entities (electronic or human) external to outbound traffic agent 400.

Outbound traffic agent 400 also includes outbound traffic engine 420, which represents one or more functions or module that enable outbound traffic agent 400 to provide the security services as described above. The example of FIG. 4 provides several modules that may be included in outbound traffic engine 420; however, different and/or additional modules may also be included. Example modules that may be involved in providing the outbound firewall functionality include firewall interface(s) 430, application interface(s) 440, traffic analysis module 450, context management module 460 and actions module 470. Each of these modules may further include other sub-modules to provide other functions. As used herein, a module refers to routine, a subsystem, logic circuit, microcode, etc., whether implemented in hardware, software, firmware or some combination thereof.

Firewall interface(s) 430 provides interface(s) between outbound traffic engine 420 and one or more firewalls. Firewall interface(s) 430 may be hardware interfaces (e.g., Ethernet, USB) and/or software interfaces (e.g., APIs). Similarly, application interface(s) 440 provide interface(s) between outbound traffic engine 420 and one or more applications. Application interface(s) 440 may be hardware interfaces (e.g., Ethernet, USB) and/or software interfaces (e.g., APIs).

Traffic analysis module 450 provides the firewall operations described herein. Traffic analysis module 450 may also interact with actions module 470 to cause the response message to be redirected, if necessary. Context management module 460 operates to maintain and store context information received from one or more applications/firewalls and other systems that may be used for outbound firewall operations.

System Overview

Figure 5:
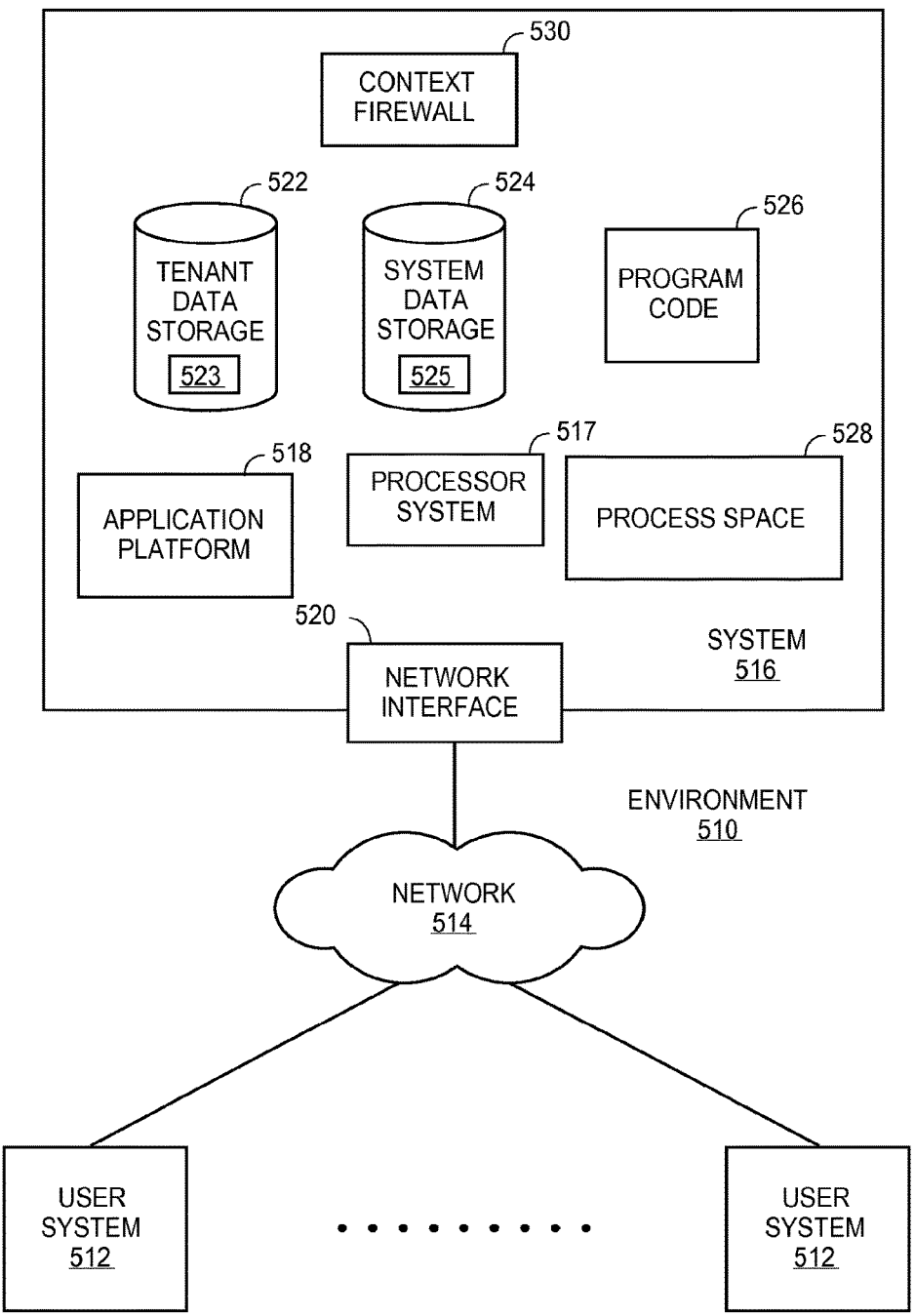
FIG. 5 is a block diagram of an environment in which an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). In one embodiment, system 516 includes firewall 530 that provides the firewall functionality as described herein. Some on-demand database services may store information from one or more tenants stored into tables of a common database image to form a multi-tenant database system (MTS). Accordingly, "on-demand database service 516" and "system 516" will be used interchangeably herein.

A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514.

Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 516 is configured to provide web pages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations.

Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
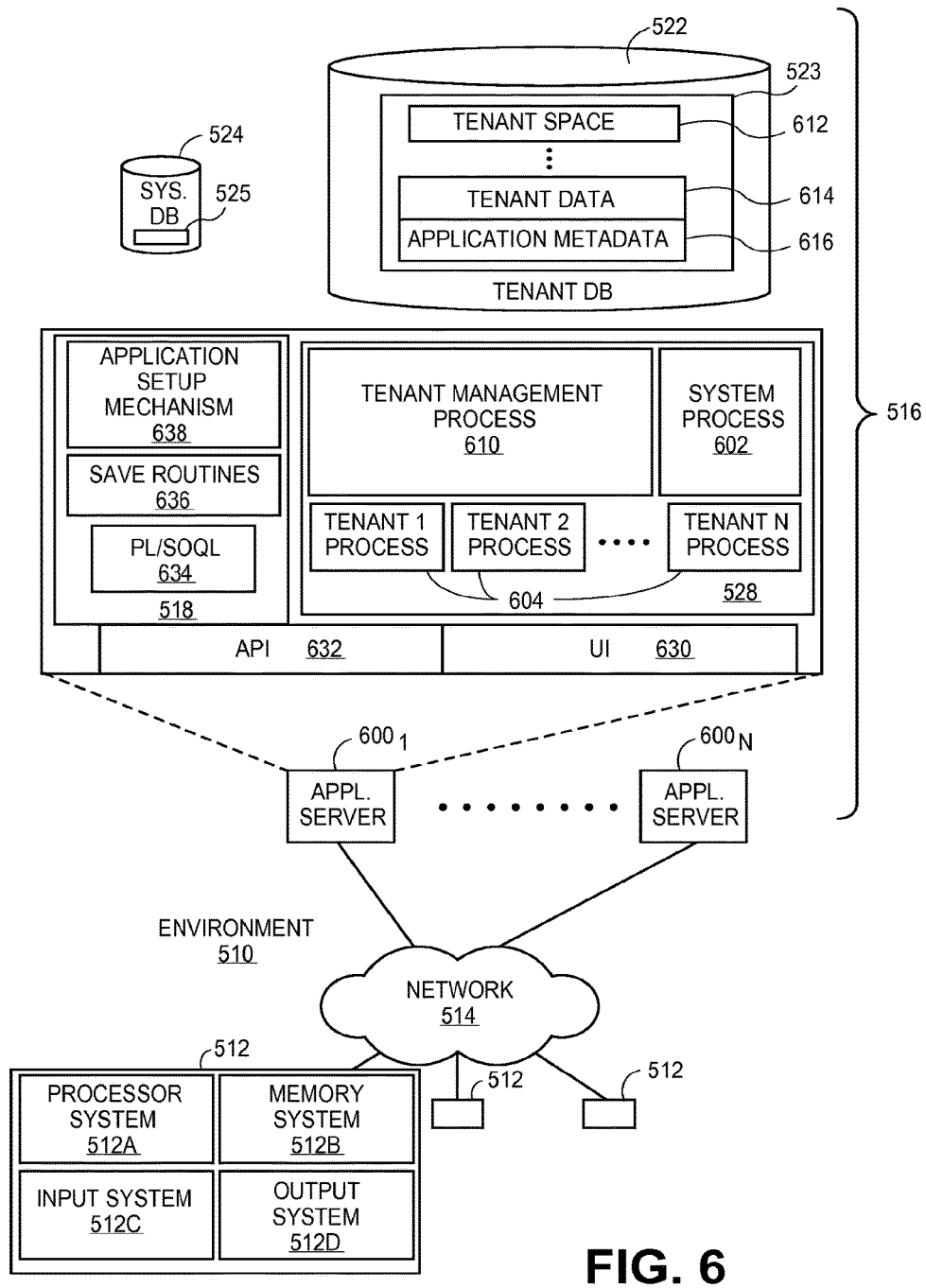
FIG. 6 is a block diagram of one embodiment of a multi-tenant environment.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers 6001-600N, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524.

Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle' databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632.

A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600i might be coupled via the network 514 (e.g., the Internet), another application server 600N-1 might be coupled via a direct network link, and another application server 600N might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600.

In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

CONCLUSION

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
    Receiving an outbound message from an application executing on a hardware computing device with an application-level firewall, the outbound response being in response to a request message received from outside a system including the application-level firewall, wherein the outbound message includes at least a trustworthiness indicator and marking information based on inbound processing at the application-level firewall for the one or more portions of the outbound message comprising at least untrusted code or comprising at least untrusted data, wherein the outbound message is to be transmitted to a remote electronic device;
    analyzing the outbound message based on the trustworthiness indicator and/or marking information, and context information with the application-level firewall; and
    performing an action on traffic to the application based on encoded user data and the context information with one of the application-level firewall and the application by forwarding without modification when the outbound message is to be considered safe and redirecting the outbound message to a designated safe URL when the outbound message is to be considered unsafe.

2. The method of claim 1 further comprising encoding the outbound message with the application firewall based on the trustworthiness indicator before passing the outbound message.

3. The method of claim 1 wherein the action comprises marking data as unexecutable.

4. The method of claim 1 wherein the action comprises encoding data based on the context information to render the data safely on the user device.

5. The method of claim 1 wherein the action comprises forwarding the response message to the remote user device.

6. The method of claim 1 wherein the action comprises redirecting the response message.

7. The method of claim 1 wherein the host system comprises a multitenant database environment, wherein the multitenant database environment stores data for multiple client entities each identified by a tenant identifier (ID) having one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

8. A non-transitory computer-readable medium having stored thereon instructions that, when executed by one or more processors, are configurable to cause the one or more processors to:
    receive an outbound message from an application executing on a hardware computing device with an application-level firewall, the outbound response being in response to a request message received from outside a system including the application-level firewall, wherein the outbound message includes at least a trustworthiness indicator and marking information based on inbound processing at the application-level firewall for the one or more portions of the outbound message comprising at least untrusted code or comprising at least untrusted data, wherein the outbound message is to be transmitted to a remote electronic device;
    analyze the outbound message based on the trustworthiness indicator and/or marking information, and context information with the application-level firewall; and
    perform an action on traffic to the application based on encoded user data and the context information with one of the application-level firewall and the application by forwarding without modification when the outbound message is to be considered safe and redirecting the outbound message to a designated safe URL when the outbound message is to be considered unsafe.

9. The non-transitory computer-readable medium of claim 8 further comprising instructions that, when executed by the one or more processors, cause the one or more processors to encode the outbound message with the application firewall based on the trustworthiness indicator before passing the outbound message.

10. The non-transitory computer-readable medium of claim 8 wherein the action comprises marking data as unexecutable.

11. The non-transitory computer-readable medium of claim 8 wherein the action comprises forwarding the response message to the remote user device.

12. The non-transitory computer-readable medium of claim 8 wherein the action comprises redirecting the response message.

13. The non-transitory computer-readable medium of claim 8 wherein the host system comprises a multitenant database environment, wherein the multitenant database environment stores data for multiple client entities each identified by a tenant identifier (ID) having one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

14. A system comprising:
    at least one hardware computing device executing an application-level firewall, the server system to provide a multitenant environment, wherein the multitenant environment includes data for multiple client entities, each identified by a tenant identifier (ID) having one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities, the server system further to receive an outbound message from an application executing on a hardware computing device with an application-level firewall, the outbound response being in response to a request message received from outside the multitenant environment, wherein the outbound message includes at least a trustworthiness indicator and marking information based on inbound processing at the application-level firewall for the one or more portions of the outbound message comprising at least untrusted code or comprising at least untrusted data, wherein the outbound message is to be transmitted to a remote electronic device, to analyze the outbound message based on the trustworthiness indicator and/or marking information, and context information with the application-level firewall, and to perform an action on traffic to the application based on encoded user data and the context information with one of the application-level firewall and the application by forwarding without modification when the outbound message is to be considered safe and redirecting the outbound message to a designated safe URL when the outbound message is to be considered unsafe.

15. The system of claim 14, wherein the application firewall to encode the request message based on the context information before passing the request message to the application.

16. The system of claim 14 wherein the action comprises marking data as unexecutable.

17. The system of claim 14 wherein the action comprises forwarding the response message to the remote user device.

18. The system of claim 14 wherein the action comprises redirecting the response message.

* * * * *